US011531407B2

(12) United States Patent
Kimenkowski

(10) Patent No.: US 11,531,407 B2
(45) Date of Patent: Dec. 20, 2022

(54) ARRANGEMENT FOR THE RELOCATING OF VIRTUAL OBJECT IMAGES WITHIN A REAL NON-ELECTRONIC SPACE

(71) Applicant: Cadwalk Global Pty Ltd, Mawson Lakes (AU)

(72) Inventor: Gerhard Kimenkowski, Mawson Lakes (AU)

(73) Assignee: Cadwalk Global Pty Ltd, Mawson Lakes (AU)

( * ) Notice: Subject to any disclaimer, the term of this patent is extended or adjusted under 35 U.S.C. 154(b) by 3 days.

(21) Appl. No.: 16/390,274

(22) Filed: Apr. 22, 2019

(65) Prior Publication Data

US 2019/0324558 A1 Oct. 24, 2019

(30) Foreign Application Priority Data

Apr. 20, 2018 (AU) ................. 2018901318

(51) Int. Cl.
| | |
|---|---|
| *G06F 3/044* | (2006.01) |
| *G06F 3/03* | (2006.01) |
| *G06T 7/73* | (2017.01) |
| *G06F 3/01* | (2006.01) |
| *G06F 3/0346* | (2013.01) |
| *G06T 19/20* | (2011.01) |

(52) U.S. Cl.
CPC ............ *G06F 3/0308* (2013.01); *G06F 3/011* (2013.01); *G06F 3/0325* (2013.01); *G06F 3/0346* (2013.01); *G06T 7/73* (2017.01); *G06T 19/20* (2013.01); *G06T 2219/2016* (2013.01)

(58) Field of Classification Search
CPC ...... G06F 3/0308; G06F 3/011; G06F 3/0325; G06F 3/0346; G06T 7/73; G06T 19/20; G06T 2219/2016
See application file for complete search history.

(56) References Cited

U.S. PATENT DOCUMENTS

| | | | |
|---|---|---|---|
| 2005/0264555 A1 | 12/2005 | Zhou et al. | |
| 2009/0024628 A1* | 1/2009 | Angel | G06Q 20/40 |
| 2015/0130701 A1* | 5/2015 | Kimenkowski | G06F 3/0346 |
| | | | 345/156 |
| 2015/0363070 A1* | 12/2015 | Katz | G06F 3/017 |
| | | | 715/852 |
| 2016/0232713 A1 | 8/2016 | Fangwei | |

FOREIGN PATENT DOCUMENTS

| | | |
|---|---|---|
| WO | 2013170302 | 11/2013 |
| WO | 2017093779 | 6/2017 |

* cited by examiner

*Primary Examiner* — Wing H Chow
(74) *Attorney, Agent, or Firm* — Renner Kenner Greive Bobak Taylor & Weber

(57) ABSTRACT

An arrangement for the relocating of virtual object images within a real non electronic space including a virtual object image creator adapted to project a plurality of virtual object images in a real non electronic space and at least one activatable tangible object, wherein the or each activatable tangible object is locatable within a corresponding virtual object image created by the virtual object image creator such that upon activation of the activatable tangible object by a user when the activatable tangible object is located within a virtual object image allows physical movement of the virtual object image within the real non electronic space that corresponds with physical movement and location of the activated activatable tangible object.

11 Claims, 5 Drawing Sheets

ARRANGEMENT FOR THE RELOCATING OF VIRTUAL OBJECT IMAGES WITHIN A REAL NON-ELECTRONIC SPACE

TECHNOLOGICAL FIELD

This invention relates to a unique way in which a user will be able to conveniently move around virtual object images generated in a real non-electronic space and more particularly to an advancement in a physical object which assists the user in being able to conveniently move the relevant virtual object image or images within this real non-electronic space.

BACKGROUND

The applicant had previously provided an arrangement as published in WO2013/170302 that was able to allow a user in real time and with almost a physical ability to be able to shift generated virtual object images in real non-electronic spaces from one location to another without having to go back to a main central computer or controller where the application for manipulation of the virtual image object generated was first created.

This earlier invention of the applicant meant the user could now physically engage with the virtual object images generated in a real non electronic space so that if the user wanted to move a virtual object image from one point to another within a room to determine is suitability relative to another location, all within real time, this became possible through the use of a corresponding tangible object which was configured to engage with a particular generated virtual image.

What this meant is that the user could engage with the tangible object which was connected with the corresponding virtual image and by moving the tangible object from point A over to point B, this then correlated at the same time corresponding movement of the generated virtual image which was assigned to that particular tangible object.

The introduction of the unique tangible object of the applicant's earlier invention meant that there is no requirement to have a separate person manipulating the saved file of the generated virtual images from a computer and so forth, or for in fact the person to move across to a control station for operating the generated virtual images. In this unique invention all the use will have to do is engage the tangible object which corresponds with the associated generated two dimensional and/or three dimensional and/or stereoscopic three dimensional virtual object image and move that in real time and be satisfied immediately as to whether or not the relocation of the virtual object from point A to point B is preferable.

The physical benefits of being able to pick up an object and move it instantaneously from one point to another has now become a reality even in the world of virtual created object images because of the applicants earlier invention wherein every image that has been created virtual there will be a corresponding tangible object associated with that virtual generated image so that any movement of that tangible object will be correlated or translated to the generated virtual image to move or be shifted from one location to another.

Nonetheless the applicant has subsequently realised that by assigning each virtual object image or a collection thereof to one particular tangible object for the user to physically engage, can mean that if there is a significant amount of independent stand-alone virtual object images that have been created by the virtual object image creator, this means that there also then must be a lot of corresponding tangible objects for the user to engage.

Having so many tangible objects for the user to engage could result in the real non-electronic space becoming too clustered and/or crowded with having so many physical tangible objects uniquely controlling their own specific virtual object image.

It would be advantageous economically by reducing the amount of tangible objects required but also more convenient and user-friendly to be able to reduce the amount of tangible objects required within the real non-electronic space so as to allow the user more freedom in travelling across the floor space unhindered during the movement of the virtual object images to and from alternative locations within the real non-electronic space.

Therefore it is an object of this invention to still be able to provide means for physically moving virtual object images within a real non-electronic space wherein this ability is done so by a user engaging a physical tangible object associated with that virtual object image but to do so in a way that will eliminate the requirement of each independent virtual object image which has been created or generated within a real non-electronic space to have its own specific physical tangible object.

Further objects and advantages of this invention will become apparent from a complete reading of the following specification.

SUMMARY OF THE INVENTION

An arrangement for the relocating of virtual object images within a real non electronic space, said arrangement including:

a virtual object image creator adapted to project a plurality of virtual object images in a real non electronic space;

at least one activatable tangible object, wherein the or each activatable tangible object is locatable within a corresponding virtual object image of the plurality of virtual object images created by the virtual object image creator in the real non electronic space;

such that upon activation of the activatable tangible object by a user when the activatable tangible object is located within a virtual object image allows physical movement of the virtual object image within the real non electronic space that corresponds with physical movement and location of the activated activatable tangible object located.

In preference the arrangement further includes a tracking arrangement, wherein the tracking arrangement is adapted to determine activation and positioning of the activatable tangible object within the real non-electronic space.

In preference the tracking arrangement recognises activation of the activatable tangible object by a defined user movement or orientation of the activatable tangible object by the user or wherein the tracking arrangement recognises activation of the activatable tangible object by a defined automated movement or orientation of the activatable tangible object, wherein the defined automated movement or orientation of the activatable tangible object is instigated by the use engaging with a switch, keypad and/or a user interface feature of the activatable tangible object.

In preference the user instigated automated movement or orientation of the activatable tangible object includes a motor to drive said activatable tangible object into the defined automated movement or orientation of the activatable tangible.

In preference the tracking arrangement includes a controller in communication with a tracking marker of the activatable tangible object and wherein the controller is also in communication with the virtual object image creator.

In preference the controller of the tracking arrangement is configured to determine repositioning of the activatable tangible object within the real non-electronic space when said activatable tangible object is activated such that recognition by the controller that the user has a repositioned location of the activated activatable tangible object within the real non-electronic space is recognition to the controller for the controller to instigate communication to the virtual object image creator to project the virtual object image to the repositioned location of the activated activatable tangible object within the real non-electronic space.

In preference the tracking arrangement includes optical, electro-magnetic, acoustic, inertial and/or a combination thereof of tracking capabilities.

In preference the tracking arrangement includes optical tracking with a tracking marker of the activatable tangible object.

In preference the optical tracking includes a series of cameras positionable within the real non-electronic space which are adapted to provide for infrared flashes which are reflectable off spherical receivers of the tracking marker of the activatable tangible object that are adapted to be redirected back to the array of cameras and through software image processing in communication with the array of cameras, identify movement of the activated activatable tangible object and computing of the repositioned location of the activated activatable tangible object, whereby in communication also with the controller and the virtual object image creator project the virtual object image to the repositioned location.

In preference movement of the activated activatable tangible object from a location A to a location B within the non-electronic space by a user can be highlighted as a projectable line or a series of markers by the virtual object image creator.

In preference movement of the activated activatable tangible object from a location A to a location B within the non-electronic space is adapted to be further analysed by software to calculate distance and timing between said location A and location B.

In preference the virtual object image creator is adapted to project a plurality of two dimensional virtual object images upon a floor within a real non electronic space and wherein the virtual object image creator is further adapted to project the plurality of two dimensional virtual object images upon the floor within the real non electronic space as corresponding images upon a wall in the real non electronic space Advantageously, while the virtual object image creator is still adapted to project a plurality of virtual object images into the real non-electronic space, and the user is still able to manipulate and move each of the generated virtual object images through a tangible object, the requirement for having a separate tangible object for each of the plurality of virtual object images generated by the virtual object image creator within the real non-electronic space is no longer require.

Uniquely now this invention requires that the tangible object be an activatable tangible object.

That means the tangible object only becomes specifically connected to one of the virtual object images created by the virtual object image creator once it has been activated.

Once the activatable tangible object image has been activated by a user this will then allow the physical movement of the virtual object image in which the activatable tangible object has been located there within.

Previously there was the requirement for each of the plurality of virtual object images created within the real non-electronic space to have their own tangible object which resulted in significant expense in having to have so many tangible objects for each of the independent virtual object images created but also it reduced the convenience and practicalities of the user to be able to easily move throughout the floor space of the real non-electronic space to engage with a particular virtual object image and then move it from one location to another. This invention has been able to overcome those problems.

In preference the arrangement further includes a tracking arrangement, wherein the tracking arrangement is adapted to determine the orientation and/or positioning of the activatable tangible object within the real non-electronic space.

In preference the tracking arrangement includes a controller in communication with a tracking marker of the activatable tangible object.

In preference the controller of the tracking arrangement is in further communication with the virtual object image creator.

In preference the controller of the tracking arrangement is configured to determine movement and/or reorientation of the activatable tangible object in a defined movement and/or reorientation such that recognition by the controller of the tracking arrangement that the user has moved and/or reorientated the activatable tangible object is recognition to the controller for the activation of the activatable tangible object to instigate communication to the virtual object image creator such that physical movement of the now activated activatable tangible object located within the relevant virtual object image within the real non electronic space requires the virtual object image creator to project the virtual object image to the location of the physical movement of the activated activatable tangible object within said virtual object image.

Advantageously, through the unique use of a tracking type arrangement, simple manipulation of the activatable tangible object by the user in a defined movement and/or orientation will be a signal to the tracking arrangement that this particular activatable tangible object should now be considered active with respect to the virtual image in which it has been located therein by the user.

Accordingly, communication then between the tracking arrangement and the control arrangement handling the virtual object image creator will instigate the necessary projection of the virtual object image in unison with the associated movement of the activatable tangible object by the user.

However it does need to be placed in context that this activatable tangible object need not only be activated by way of the tracking arrangement referred to above and which will be explained in greater detail shortly hereafter.

This invention would also include other more conventional ways of activating the activatable tangible object including a simple mechanical switch for a user to engage appropriate electronics/electrics within the activatable tangible object to engage with the controller to operate the virtual object image creator which is adapted to project the plurality of virtual object images into the real non-electronic space.

Advantageously, the communication between the activatable tangible object and the virtual object image creator means that when the user does physically move the activatable tangible object from one location to another within the real non-electronic space, means that the actual movement by the user can be recorded or acknowledged by way of a further generated image, normally on the floor of the real non-electronic space.

Therefore the user can see where they have moved from one point to another.

In preference this line of movement, as well as being illuminated as a virtual object image within the real non-electronic space, can be further analysed by software to calculate distance and timing between said locations and the like within the real non-electronic space which was established by the user through the physical movement of the activatable tangible object.

In a further form of the invention there is provided an arrangement for the relocating of virtual object images within a real non electronic space, said arrangement including:

a virtual object image creator adapted to project a plurality of two dimensional virtual object images upon a floor in a real non electronic space;

at least one activatable tangible object, wherein the or each activatable tangible object is locatable within a corresponding two dimensional virtual object image of the plurality of virtual object images created by the virtual object image creator upon the floor in the real non electronic space;

such that upon activation of the activatable tangible object by a user when the activatable tangible object is located within the two dimensional virtual object image allows physical movement of an activated activatable tangible object located within the two dimensional virtual object image upon the floor within the real non electronic space to provide a corresponding physical movement of the two dimensional virtual object image to which the activated activatable tangible object in located within; and wherein the virtual object image creator is further adapted to project the plurality of two dimensional virtual object images upon the floor in the real non electronic space as corresponding three dimensional virtual object images upon a wall in the real non electronic space with further projection in three dimensions upon the wall in the real non electronic space of the corresponding physical movement of the two dimensional virtual object image upon the floor provided by the physical movement of the activated activatable tangible object located within the two dimensional virtual object image upon the floor in the real non electronic space.

Advantageously, this further form of the invention provides a unique way in which, while the generation of the virtual object images upon the floor in the real non-electronic space may be two dimensional, the user is then able to conceptualise things more on a three dimensional basis by looking at the corresponding three dimensional arrangement which is provided for upon the wall of the non-electronic space.

Nonetheless the movement of the created virtual object images, whether it be within the two dimensional virtual object images on the floor of the real non-electronic space, or the corresponding three dimensional virtual object images on the wall of the real non-electronic space, only becomes possible because of the ability to activate the activatable tangible object with the specific virtual object image on the floor of the real non-electronic space in which the activatable tangible object has been placed therein.

In order now to describe the invention in greater detail a preferred embodiment will be presented with the assistance of the following illustrations and accompanying text.

BRIEF DESCRIPTION OF ILLUSTRATIVE EMBODIMENTS

DETAILED DESCRIPTION OF THE DRAWINGS

Figure 1:
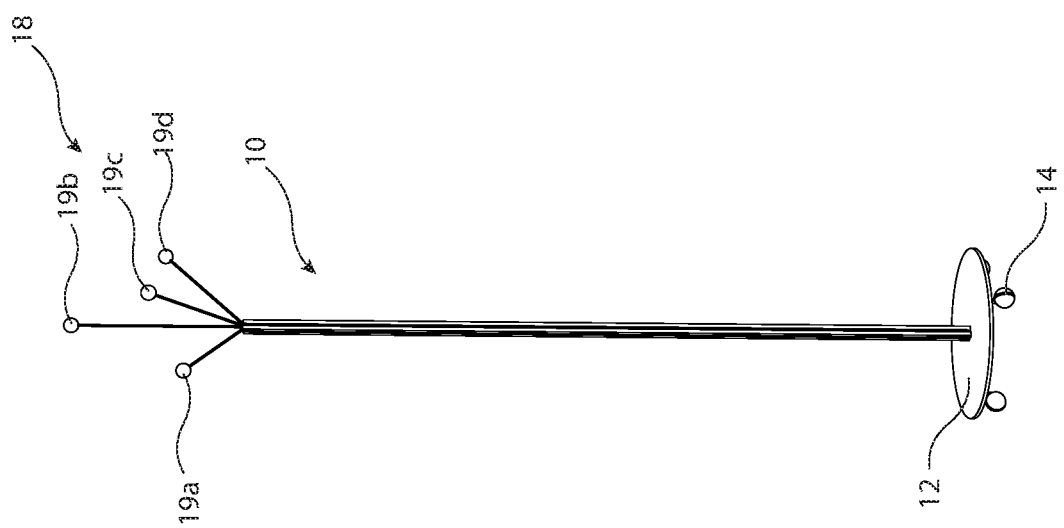
FIG. 1 is a perspective view of the activatable tangible object of the arrangement for the relocating of virtual object images within a real non-electronic space in a preferred embodiment of the invention.

FIG. 1 provides an example of an activatable tangible object shown generally as (10) which is used for virtual object images within a real non-electronic space by a user.

The activatable tangible object includes a base plate (12) which is supported by a ground engaging means (14).

Figure 2:
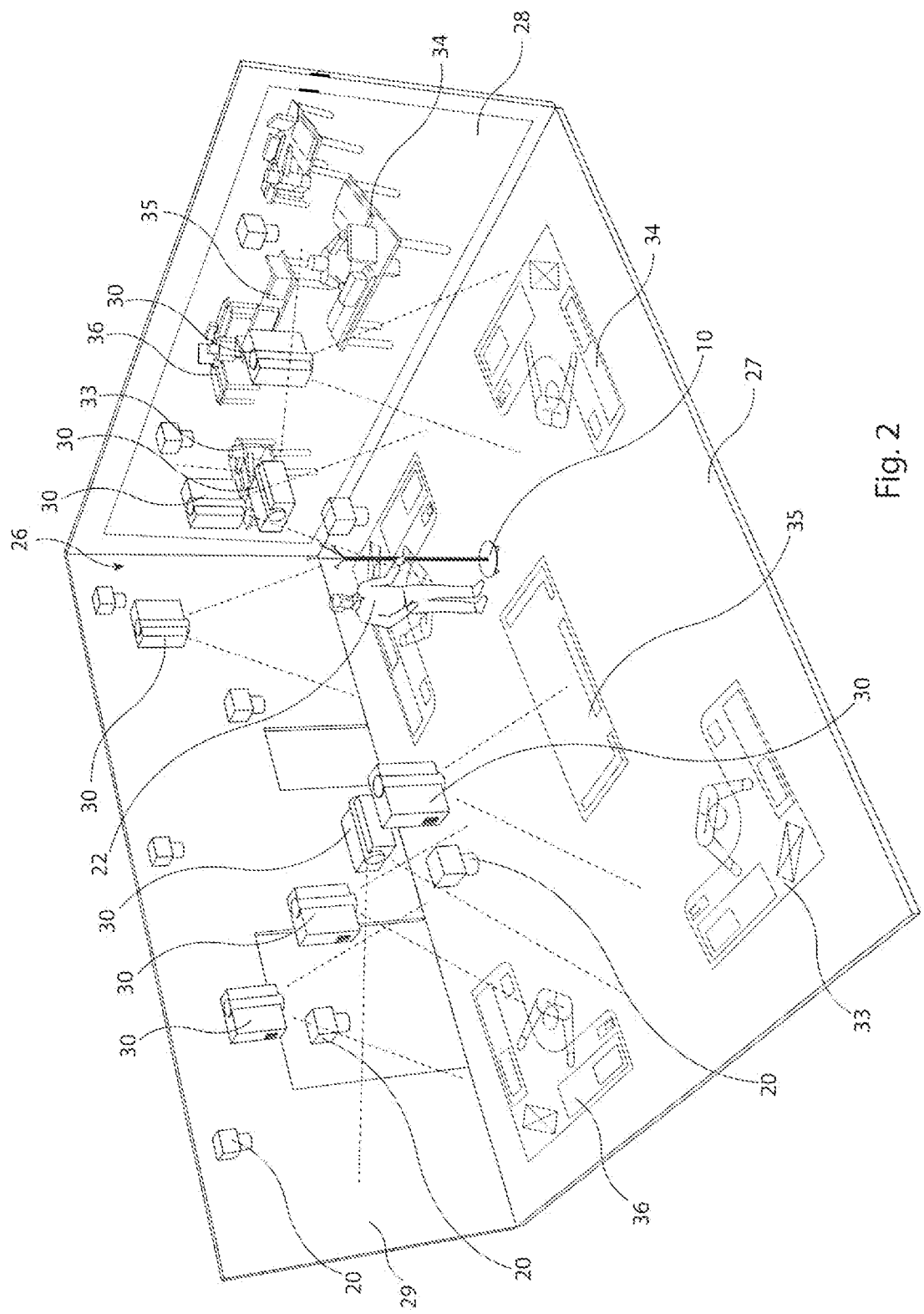
FIG. 2 is a schematic representation of a preferred embodiment of this invention illustrating the generation of the virtual object images in both two dimensional upon the floor of the real non-electronic space and in three dimension upon the wall of the real non-electronic space.

There is a central user grasping shaft (16) which supports the tracking arrangement shown generally as (18) which in the preferred embodiment utilises optical tracking technology such that the tracking marker (18) of the activatable tangible object (10) includes a series of spherical markers (19a), (19b), (19c) and (19d) which are adapted to reflect infrared flashes from a camera arrangement shown as (20) in FIG. 2 wherein the camera arrangement (20) is also configured then to receive back the reflection from the spherical markers (19a), (19b), (19c) and (19d) wherein then appropriate software, working in conjunction with the camera arrangement (20), provides for imaging processing to calculate the positioning and/or orientation of the activatable tangible object (10).

Figure 3:
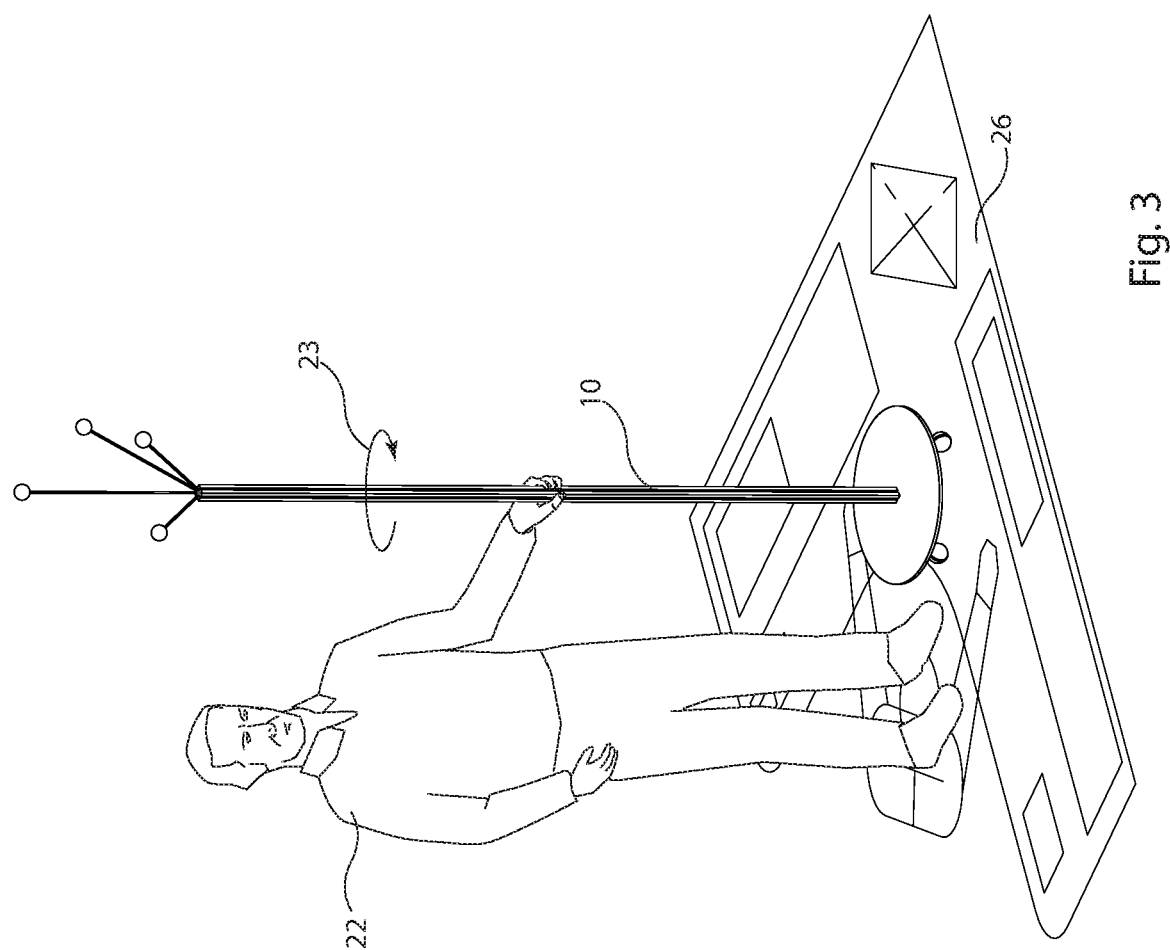
FIG. 3 is a schematic representation, representing a preferred embodiment of the activation by a user of the activatable tangible object.

Importantly this invention is not limited to optical tracking only but in the preferred embodiment shown in the illustrations and notably in FIG. 3, when the activatable tangible object (10) is engaged by a user (22), the gesture of the user (22) of rotating the activatable tangle object (10) by the user (22) to a defined degree of rotation which can be calculated and confirmed as being taken by the tracking arrangement and the associated supporting software to then place the activatable tangible object (10) in an active status.

Accordingly, as shown in FIG. 3 if the user (22) locates the activatable tangible object (10) within an image (24), wherein the image (24) is made up of a all series of images together, then physical movement of the activatable tangible object which has now been activated by the gesture of the user (22) shown by way of arrow (23) in FIG. 3, means that any physical movement by the user (22) of the now activated activatable tangible object (10) will correspond with the same corresponding movement of the virtual object image (24) in which the activatable tangible object (10) has been located therein.

To further place the invention in context, FIG. 2 shows a real non-electronic space (26) which in the preferred embodiment shown in FIG. 2 could best be described as a large open room having a floor (27) and enclosing walls shown as (28) and (29).

The room (26) includes the infrared camera arrangement (20) which is supported above the floor (27).

Also supported above the floor (27) within the room (26) of the real non-electronic space is a series of projectors (30).

This series of projectors (30) is the virtual object image creator, and, in the preferred embodiment, the series of projectors (30) works with the controller of the virtual object image creator to project out a series of virtual object images, which in the case of FIG. 2 includes a series of independent images (33), (34), (35), and (36).

As best seen in FIG. 2, the two dimensional images (33), (34), (35), and (36) upon the floor (27) of the room (26) are also projected as corresponding representations upon the wall (28) of the room (26).

In FIG. 2 the user (22) has taken hold of the activatable tangible object (10).

Should the user (22) want to reposition any of the plurality of virtual object images (33), (34), (35), and (36) that have been projected upon the floor (27) of the room (26), this can be achieved by the user (22) taking hold of the activatable tangible object (10) to then drag the activatable tangible object (10) over one of the images, so it becomes possible for the user (22) to be able to move that virtual object within the room (26) once the activatable tangible object (10) is located within that image and the user (22) then activates the activatable tangle object (10).

Figure 4:
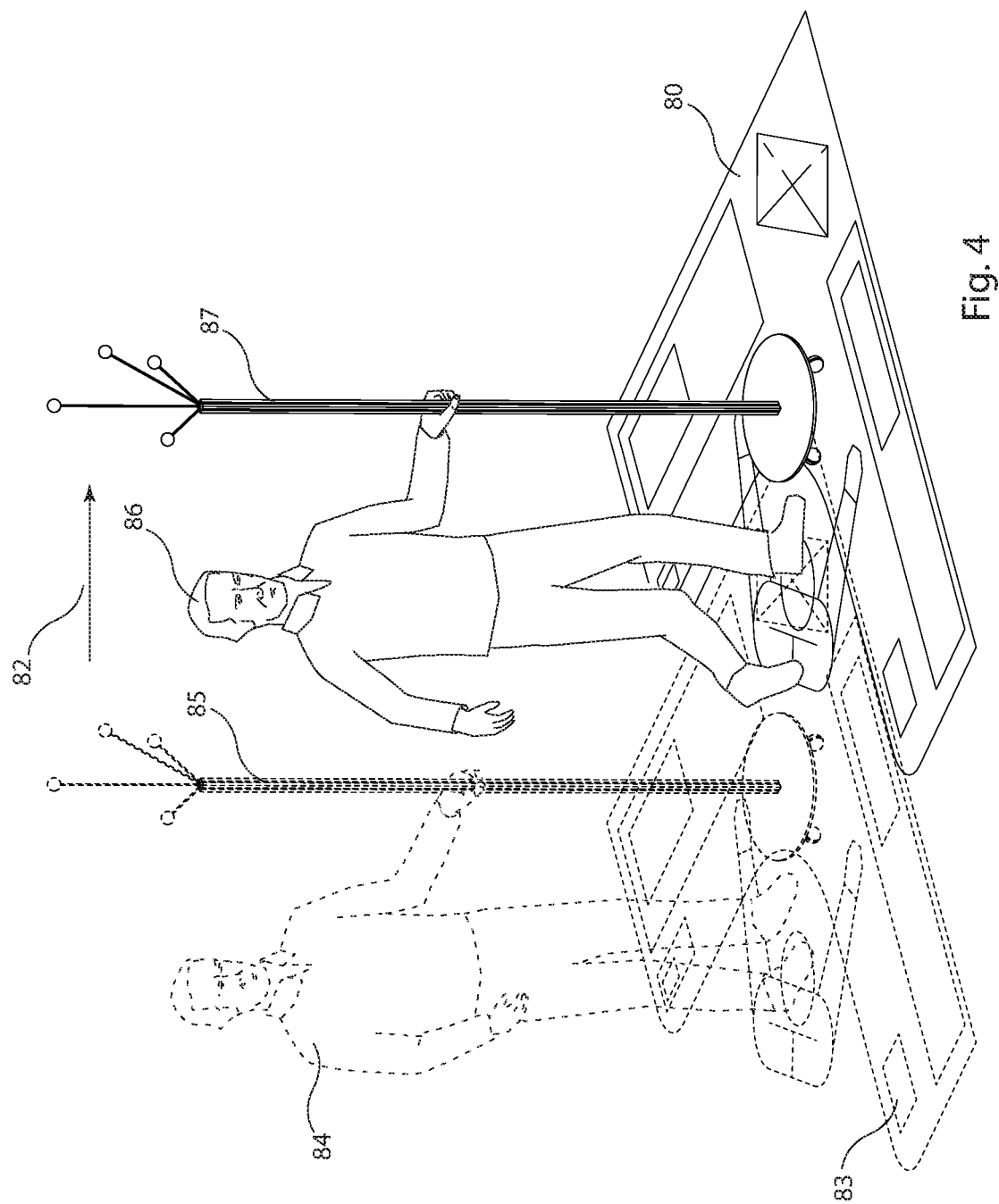
FIG. 4 is a schematic representation which in part is an extension of the schematic representation shown in FIG. 3, whereby once the activatable tangible object has been activated when located within a virtual object image, the movement of the activated tangible object by the user corresponds to movement of the virtual object image in which the activatable tangible object has been located.

In FIG. 4 the broken lines illustrate the first location of the virtual image (83) that requires moving, along with the user (84) and activatable tangible object (85) with arrow (82) showing direction of required movement. Then unbroken lines represent the user (86) and an activated activatable tangible object (87) moving the virtual image (83) to a new position identified in FIG. 4 as virtual image (80).

Again in the preferred embodiment, the way in which the user (22) will activate the activatable tangible object (10) is through the rotation of the activatable tangible object (10) shown by way of arrow (23) in FIG. 3.

As part of the tracking arrangement represented generally as (20), the tracking arrangement by being able to inherently determine the position and/or orientation of the activatable tangible object (10) is adapted to recognise the gesturing of the user (22) which has resulted in a rotation of the activatable tangible object (10) which then instigates a degree of communication between the tracking arrangement and also the virtual object image creator and the respective controllers so as to recognise that the user (22) has deliberately engaged with the activatable tangible object (10), located it within a virtual object image to which now further movement of the user (22) of the activated activatable tangible object requires that this movement initiated by the user (22) physically upon the activated activatable tangible object (10) also results in the virtual object image creator, which in the preferred embodiment includes the series of projectors (30) will also corresponding move the virtual image to which the user (22) originally located the activatable tangible object (10) therein.

Although not shown in the illustrations, movement of any of the projected two dimensional images (33), (34), (35), and (36) upon the floor (27) of the room (26) as a result of the user (22) activating the activatable tangible object once located within the respective virtual object image also results in the corresponding movement of the three dimensional version of that virtual object image which has been projected onto the wall (28) of the room (26).

In the preferred embodiment, referencing to the virtual object images generated upon the floor of the real non-electronic space have been described in two dimensions, nonetheless this invention covers generation of the virtual object images also within 3-D upon the floor of the real non-electronic space.

Figure 5:
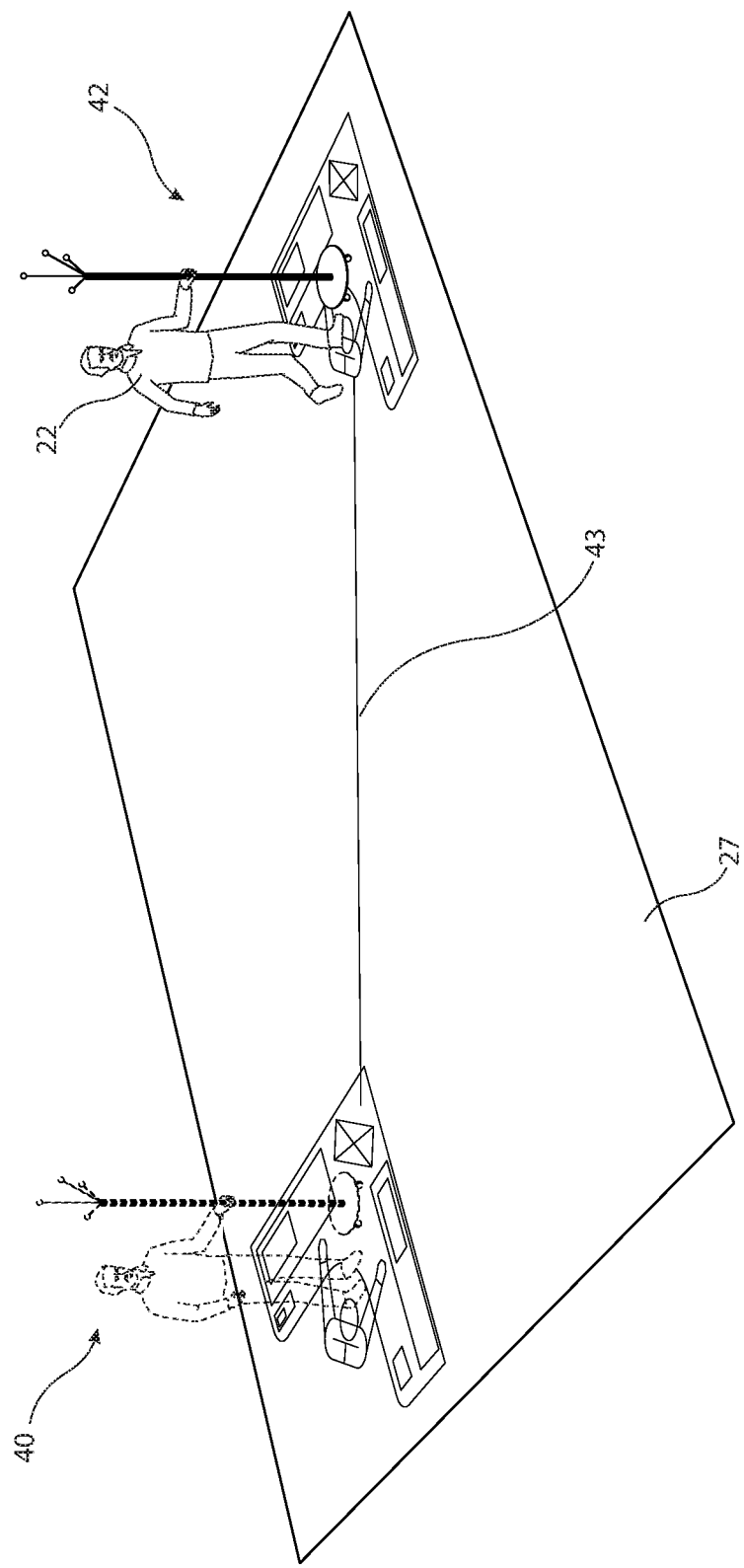
FIG. 5 is a schematic representation showing a further feature of a preferred embodiment of the invention with respect to generating a projected image upon the floor of the real non-electronic space that tracks the movement of the activatable tangible object by the user as they relocate virtual object images from one place to another.

In FIG. 5 a further aspect of the invention is presented, wherein again the user (22) by way of activating the activatable tangible object (10) has been able to move a virtual object image from a first location shown as (40) to a second location shown generally as (42). The movement of the activatable tangible object (10) from location (40) to location (42) has also resulted in the generation of an illuminated tracking line shown as (43) which assists the user (22) in understanding the movements and the path taken between relevant locations (40) and (42).

This defined line (43) between locations (40) and (42) can be using the appropriate software be further processed to help calculate and provide results as to the distances and potential time for a user to travel between these separate locations (40) and (42), which can then assist in deciding the location of one real life feature to that of another in the designing of a particular floor space so as to provide optimum convenience, and even safety to the ultimate users of a relevant floor space that will be constructed from the virtual design arrangement provided by this invention.

The invention claimed is:

1. An arrangement for the relocating of virtual object images within a real non electronic space, said arrangement including:
   a virtual object image creator adapted to project a plurality of independent virtual object images upon a floor in a real non electronic space;
   a free standing tangible object locatable within a selected virtual object image of the plurality of independent virtual object images created by the virtual object image creator upon the floor in the real non electronic space;
   wherein the free standing tangible object includes an activated state and an inactivated state, the activated state and inactivated state being established by action of a user, wherein, when the free standing tangible object is located within the selected virtual object image and the activated state is established by action of the user, the selected virtual object image becomes operatively associated with the activated tangible object such that physical movement of the activated tangible object within the real non electronic space causes movement in the same direction of the selected virtual object, and when the inactivated state is established by action of the user, the tangible object is not operatively associated with any virtual object such that movement of the tangible object within the real non electronic space does not result in movement of any virtual object; and
   a tracking arrangement, wherein the tracking arrangement is adapted to determine activation and positioning of the free standing tangible object within the real non-electronic space, and the tracking arrangement recognises the activated state of the free standing tangible object, the activated state being established either by a defined user movement or orientation of the free standing tangible object or by activating a switch, keypad and/or a user interface feature of the free standing tangible object.

2. The arrangement of claim 1 wherein activating the switch, keypad and/or a user interface feature of the free standing tangible object operates a motor to drive said free standing tangible object into a defined automated movement or orientation that establishes the activated state.

3. The arrangement of claim 2 wherein the tracking arrangement includes a controller and a tracking marker of the free standing tangible object and wherein the controller is also in communication with the virtual object image creator.

4. The arrangement of claim 3 wherein the controller of the tracking arrangement is configured to determine repositioning of the activated tangible object within the real non-electronic space to a repositioned location, and, upon determining such a repositioned location has been reached, the controller instigates communication to the virtual object image creator to project the selected virtual object image to the repositioned location of the activated tangible object within the real non-electronic space.

5. The arrangement of claim 4 wherein the tracking arrangement includes optical tracking with a tracking marker of the free standing tangible object.

6. The arrangement of claim 5 wherein the optical tracking includes a series of cameras positioned within the real non-electronic space and adapted to provide for infrared flashes which are reflected off spherical receivers of the tracking marker and redirected back to the array of cameras; wherein, through software image processing in communication with the array of cameras, the optical tracking includes identifying movement of the activated tangible object, computing the repositioned location of the activated tangible object; and, together with the controller and the virtual object image creator, projecting the virtual object image to the repositioned location.

7. The arrangement of claim 6 wherein movement of the activated tangible object upon the floor from a starting location to the repositioned location within the real non-electronic space by a user is highlighted as a projectable line or a series of markers by the virtual object image creator.

8. The arrangement of claim 7 wherein movement of the free standing activated tangible object upon the floor from the starting location to the repositioned location within the real non-electronic space is adapted to be further analysed by software to calculate distance and timing between the starting location and the repositioned location.

9. The arrangement of claim 1 wherein the tracking arrangement includes optical, electro-magnetic, acoustic, inertial and/or a combination thereof of tracking capabilities.

10. The arrangement of claim 1 wherein the virtual object image creator projects the plurality of independent virtual object images upon the floor within the real non electronic space as two dimensional virtual object images, and the virtual object image creator is further adapted to project the plurality of independent virtual object images upon a wall within the real non electronic space wherein a projection upon a wall of a given one of the plurality of independent virtual object images corresponds to the two dimensional image of that given one of the plurality of independent virtual object images.

11. An arrangement for the relocating of virtual object images within a real non electronic space, said arrangement including:
    a virtual object image creator adapted to project a plurality of independent virtual object images upon a floor in a real non electronic space;
    a free standing tangible object selectively locatable within any two or more of the plurality of independent virtual object images created by the virtual object image creator upon the floor in the real non electronic space;
    wherein the free standing tangible object includes an activated state and an inactivated state, the activated state and inactivated state being established by action of a user, wherein, when the free standing tangible object is located within a selected virtual object image of the plurality of virtual object images and the activated state is established by action of the user, the selected virtual object image becomes operatively associated with the activated tangible object such that physical movement of the activated tangible object within the real non electronic space causes movement in the same direction of the selected virtual object, and when the inactivated state is established by action of the user, the tangible object is not operatively associated with any virtual object such that movement of the tangible object within the real non electronic space does not result in movement of any virtual object, such that the free standing tangible object can, at the selection of a user of the free standing tangible object, be associated with any of the plurality of independent virtual object images to move the same; and
    a tracking arrangement, wherein the tracking arrangement is adapted to determine activation and positioning of the free standing tangible object within the real non-electronic space, and the tracking arrangement recognises the activated state of the free standing tangible object, the activated state being established either by a defined user movement or orientation of the free standing tangible object or by activating a switch, keypad and/or a user interface feature of the free standing tangible object.

* * * * *